March 24, 1942.   J. A. BYLER   2,277,204
CONDUIT BENDER
Filed March 14, 1941   2 Sheets-Sheet 1

Jack A. Byler,
INVENTOR

March 24, 1942.            J. A. BYLER            2,277,204
                         CONDUIT BENDER
                    Filed March 14, 1941            2 Sheets-Sheet 2
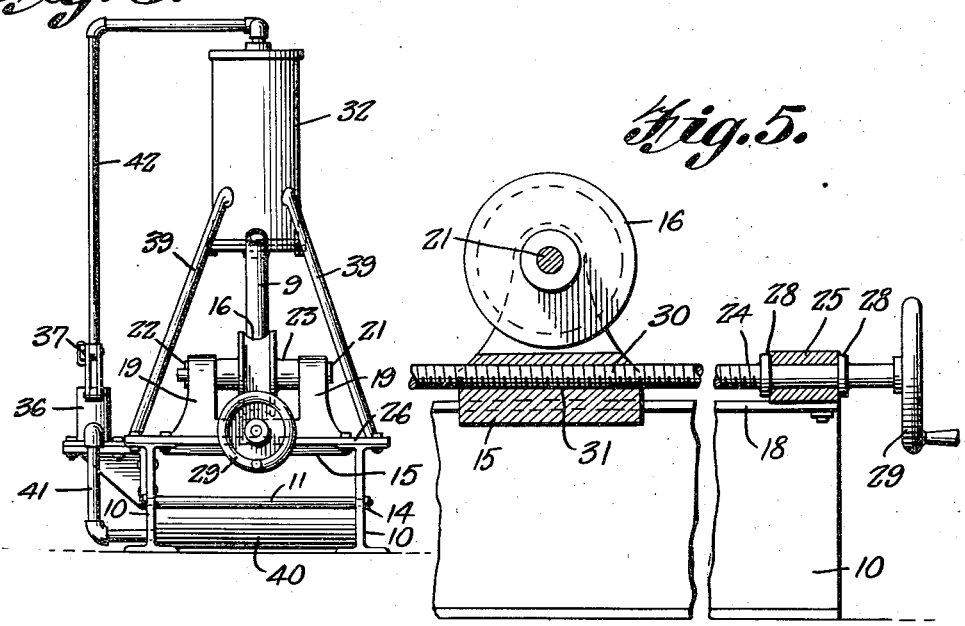
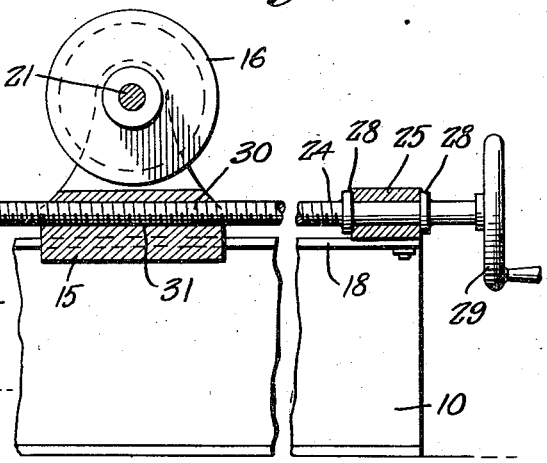
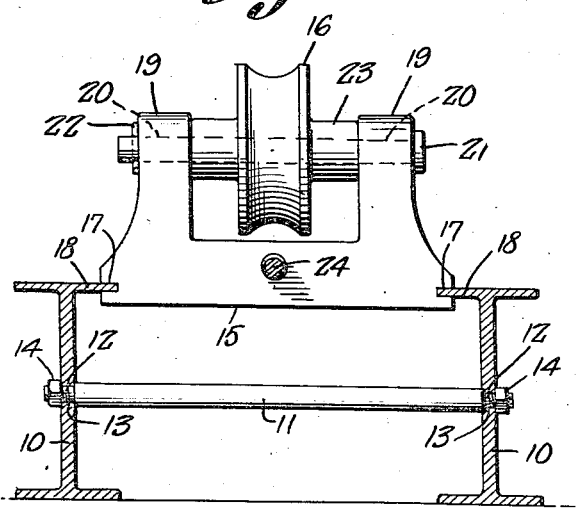
Jack A. Byler,
INVENTOR
BY Victor J. Evans & Co.
ATTORNEYS Patented Mar. 24, 1942

2,277,204

UNITED STATES PATENT OFFICE 2,277,204

CONDUIT BENDER

Jack A. Byler, Springhill, La.

Application March 14, 1941, Serial No. 383,426

3 Claims. (Cl. 153—38)

This invention relates to conduit benders and has for an object to provide a device of this character having grooved conduit supporting rollers adjustably mounted on a horizontal bed for movement toward and away from each other to permit bends of various radii being formed in conduits.

A further object is to provide supporting rollers which are mounted on beams removably secured to the carriages of the rollers so that rollers having various sizes of grooved peripheries may be interchangeably received on the carriers to receive conduits of different diameters.

A further object is to provide a portable conduit bender having a hydraulic cylinder mounted on the bed between the rollers provided with a piston having a shoe adapted to receive the conduit and form a bend in the same midway between the rollers.

A further object is to provide apparatus of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 3 is an end elevation of the conduit bender.

Figure 4 is a cross sectional view, drawn to enlarged scale, showing the slide connection of a roller carriage with the I-beams forming the horizontal bed of the conduit bender.

Figure 5 is a side elevation, with parts in section, of the roller carriage and bed shown in Figure 4.

Figure 1:
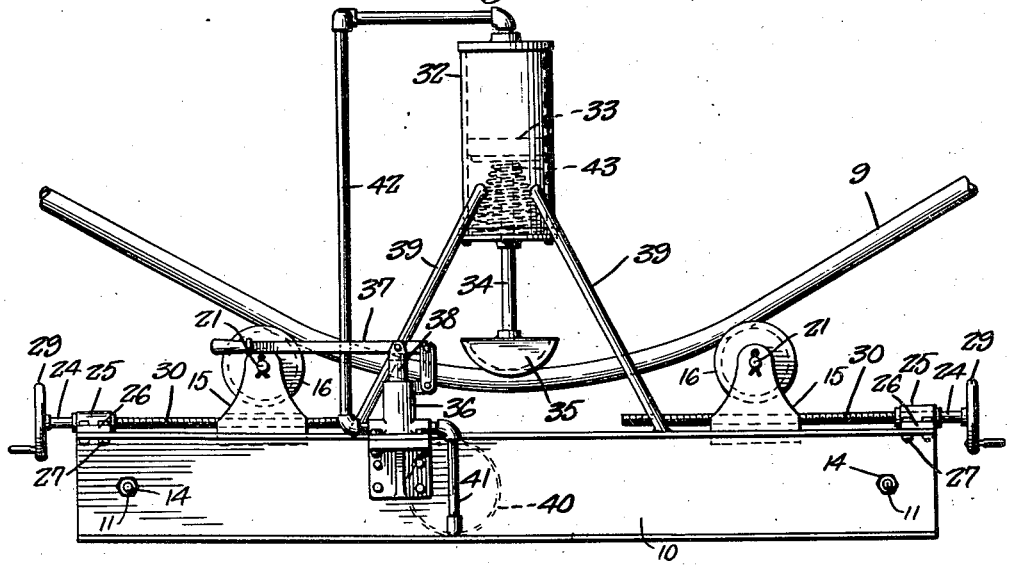
Figure 1 is a side elevation of a conduit bender constructed in accordance with the invention.

Referring now to the drawings, the conduit bender comprises a bed formed of a pair of spaced I-beams 10 arranged in parallel relation and fixedly secured together by transversely disposed brace rods 11, see Figure 4, having reduced threaded extremities 12 engaged through openings 13 in the webs of the I-beams and equipped with nuts 14 exteriorly of the webs.

Carriages 15 carrying concave rollers 16 are mounted upon the bed for adjustment toward and away from the center of the bed. Each carriage is provided at opposite ends with grooves 17, see Figure 4, which slidably receive the inner edge portions of the upper flanges 18 of both I-beams. Each carriage is provided with spaced standards 19 which are provided with aligned openings 20 to removably receive a headed pin 21. A cotter pin 22 is engaged through the end of the pin opposite the head to prevent accidental dislodgment of the pin 21. The hub 23 of the aforesaid grooved roller 16 is loosely sleeved on the pin. Removal of the pin permits rollers having various sizes of grooves in their peripheries being interchanged on the pin to receive conduits 9 of different diameters.

Figure 2:
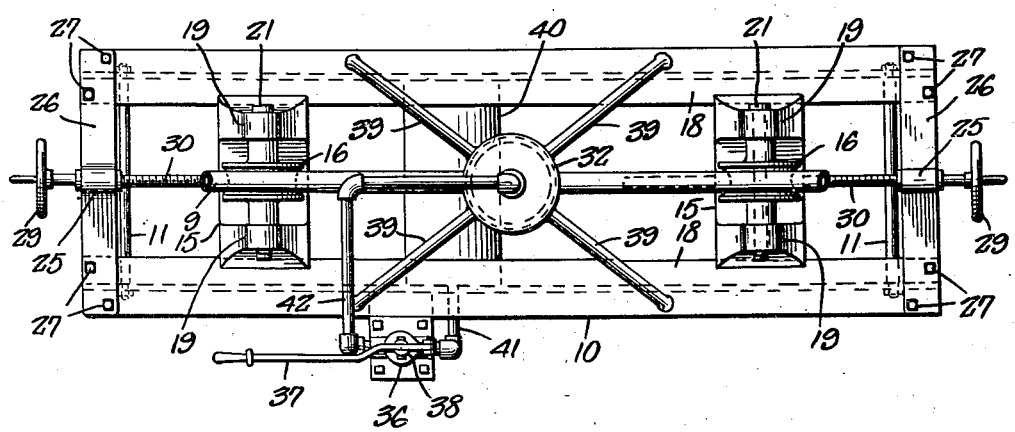
Figure 2 is a top plan view of the conduit bender.

For adjusting each carriage, a shaft 24 is rotatably mounted in a bearing 25 which is formed at the center of a cross arm 26, see Figure 2, the cross arm being bolted at the ends, as shown at 27, to the ends of the upper flanges 18 of both I-beams. The shaft is equipped with spaced collars 28 which engage the ends of the bearing and prevent endwise movement of the shaft. The shaft is equipped at one end with a hand wheel 29, and the opposite end is threaded, as shown at 30, for reception in a threaded opening 31 formed in the carriage 15. By rotating the hand wheels both carriages may be adjusted an equal distance toward or from the center of the bed so that bends of various radii may be formed in the conduits supported by the rollers 16.

A hydraulic cylinder 32 is mounted vertically above the center of the bed and is provided with a piston 33 having a piston rod 34, which projects downwardly through the lower head of the cylinder and terminates in a grooved shoe 35 adapted to straddle the conduit midway between the supporting rollers 16 and deform the conduit when the piston is moved downward by hydraulic pressure. Oil is forced into the top of the cylinder above the piston by a hand pump 36, in the nature of a hydraulic jack having a handle lever 37 and a piston 38. The hydraulic jack is of the type in which pumping movement forces oil into the cylinder but when the handle lever is forced downward to its limit of movement, the plunger unseats the controlling valves of the pump to permit free flow of the oil from the piston back into the reservoir. Downwardly diverging rods 39 are rigidly secured at the upper ends to the pump cylinder and are rigidly secured at the lower ends to the top flanges of the I-beams for supporting the cylinder against displacement under severe conditions of service.

A reservoir 40 is disposed between the inner sides of the flanges of the I-beams and is rigidly secured in position by spot welding or other means. A pipe 41 connects the reservoir with the bottom of the pump 36. A pipe 42 connects the pump with the top of the hydraulic cylinder 32.

A frustum shaped helical spring 43 is sleeved on the piston rod 34 and bears at its base end against the lower end of the cylinder and at its upper smaller end against the bottom face of the piston. After each downward stroke of the piston under impulse of the oil, the spring will move the piston forwardly to force the oil out of the cylinder through the hand pump and back into the reservoir 40.

Since the operation of the parts has been described as the description of the parts progressed, it is thought the invention will be fully understood without further explanation.

What is claimed is:

1. A conduit bender comprising a base including horizontal I-beams arranged in spaced parallel relation, a vertically disposed hydraulic cylinder, downwardly diverging rods extending from the cylinder to the upper flanges of the I-beams securing the cylinder to the I-beams above and intermediate the ends of the I-beams, supports mounted upon the I-beams for adjustment longitudinally of the I-beams toward or away from the center of the I-beams, concave rollers carried by said supports, said supports being provided with guide grooves receiving the inner edges of the upper flanges of the I-beams, means carried by the I-beams and engaging the supports for adjusting the supports, a piston in the cylinder having a piston rod terminating in a shoe below the cylinder for engaging a conduit supported upon the rollers, and means for supplying a fluid pressure medium to the cylinder.

2. The structure as of claim 1 and in which the first named means comprises shafts swivelly mounted on the I-beams and screw-threadedly engaged with the supports.

3. The structure as of claim 1 and in which said fluid pressure supplying means comprises, a fluid pressure medium reservoir disposed between and secured to the I-beams of the base, a hand pump carried by the I-beams and connected to the reservoir and to the cylinder.

JACK A. BYLER.